Figure 2:
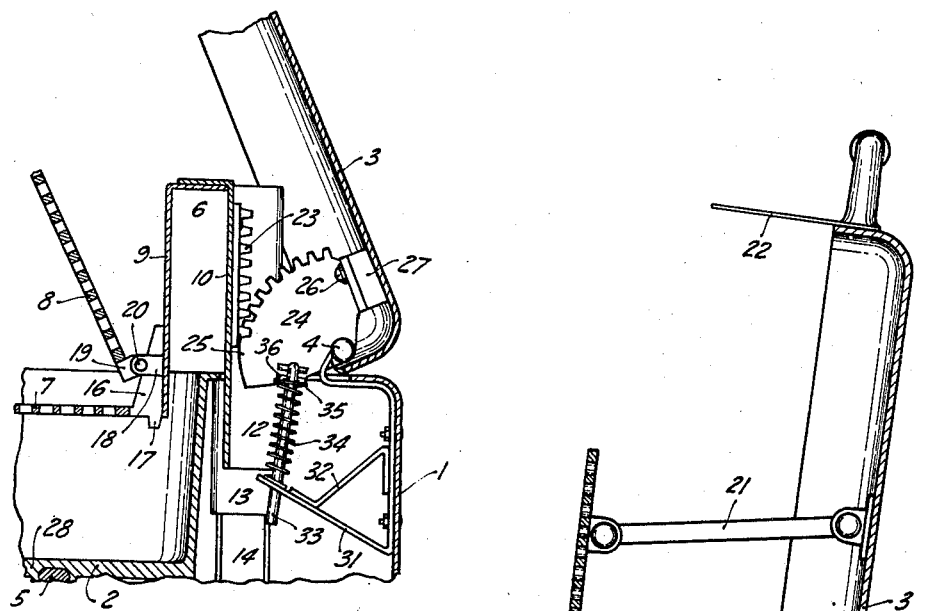

June 3, 1941.  H. W. MILLER  2,244,168
FOOD COOKER
Filed July 26, 1940 2 Sheets-Sheet 1

INVENTOR.
H. W. MILLER
BY Merrill M. Blackburn
ATTORNEY

June 3, 1941.  H. W. MILLER  2,244,168
FOOD COOKER
Filed July 26, 1940  2 Sheets-Sheet 2

INVENTOR.
H. W. MILLER
BY Merrill M. Blackburn
ATTORNEY

Patented June 3, 1941

2,244,168

UNITED STATES PATENT OFFICE 2,244,168

FOOD COOKER

Herchael Wood Miller, Davenport, Iowa, assignor to Wafl-Berger, Inc., Moline, Ill., a corporation of Illinois Application July 26, 1940, Serial No. 347,693

14 Claims. (Cl. 53—7)

The present invention relates to specific improvements in apparatus for performing the function claimed in the Fred B. Fink Patent No. 2,191,275, issued February 20, 1940, and more particularly to improvements upon the structure shown in Fig. 1 of that patent.

Among the objects of this invention are to provide improved means for separating the pressure plates in a cooker of the character indicated; to provide improved means for raising and lowering the pressure plates in a cooker of the character indicated; to provide improved means for guiding the pressure plates in their up and down motion; to provide means in a cooker of the character indicated for preventing the cooker cover from inadvertently closing when such action is not desired; to provide means for assisting in forcing the cover into completely closed position, when such is desired; and such further objects, advantages, and capabilities as are disclosed in the drawings annexed hereto and forming a part hereof and as are inherent in the structure herein disclosed. My invention further resides in the combination, construction, and arrangement of parts illustrated in the accompanying drawings, and, while I have shown therein what I regard as the preferred embodiment of this invention, I desire the same to be understood as illustrative only and not to be interpreted in a limiting sense.

Figure 1:
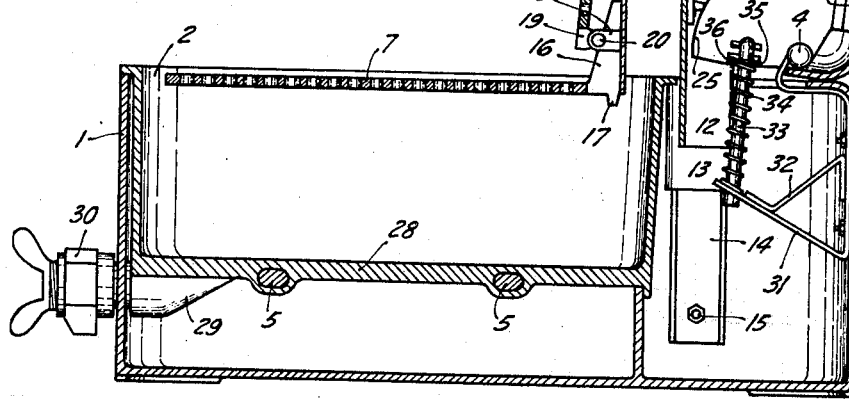
Figure 3:
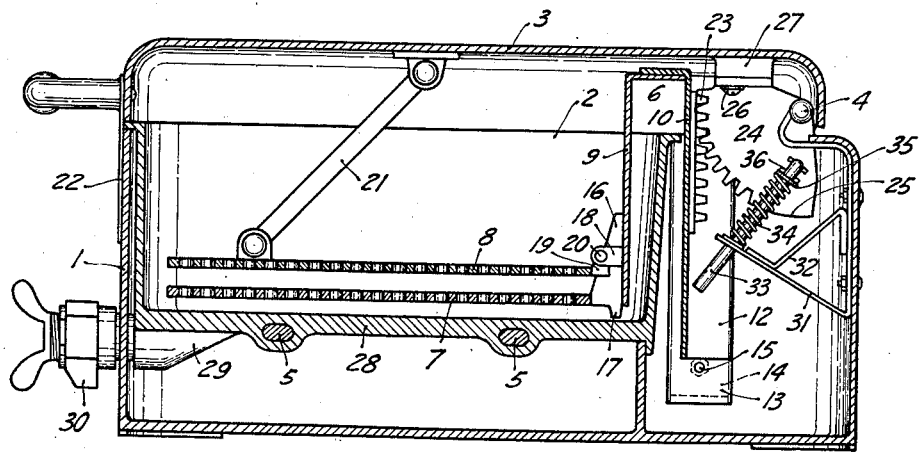
Figure 4:
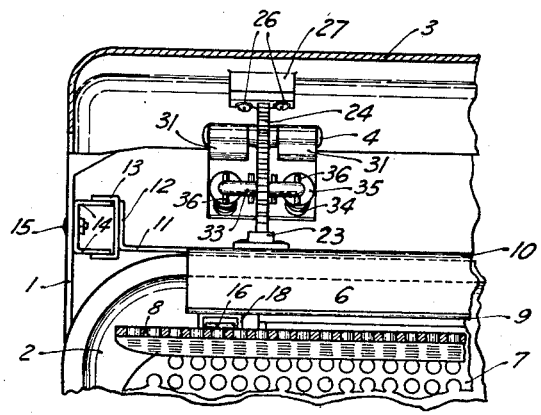

In the drawings annexed hereto and forming a part hereof,

Figs. 1, 2, and 3 represent vertical sections through an apparatus embodying my invention, Fig. 2 being fragmentary and showing the parts in different operative positions from those shown in Figs. 1 and 3; and Fig. 4 represents, fragmentarily, a horizontal plan section taken substantially along the plane indicated by the line 4—4, Fig. 1.

In the structure shown in the accompanying drawings, a container 1 contains and supports a cooking pot 2 and has a cover 3 pivotally connected thereto at 4. This cover ordinarily fits closely down on top of the container and pot, except when food is being put into or removed from the cooker. This conserves heat and reduces the escape of fumes from the heated cooking fluid. Neither this fluid nor the controlling thermostat nor the leads for the heating unit 5 are shown in these drawings, as these are all conventional.

A support 6 for the pressure plates 7 and 8 is illustrated as comprising the two elements 9 and 10 which are secured together at their upper ends to form a U-shaped member which straddles the edge of the pot 2 and may move up and down with relation thereto. At the right and left sides of the member 10 are arms 11 which extend laterally (see Fig. 4) and are bent at right angles to form the arms 12. These are secured to channel members 13, which, as shown in Fig. 4, straddle and fit closely the channel members 14 which are secured to the sides of the container 1. These channel members 14 may be secured in place by means of bolts 15 or otherwise. It is evident that upward and downward sliding of the channel members 13 with relation to the channels 14 will serve to guide the U-shaped member 6 in its up and down movements.

The lower plate 7 has a pair of lugs 16 which extend in a generally upward direction for connection to the member 9, and each of these lugs has a downward projection 17 which serves as a stop to limit the downward motion of the plate 7. Ears 18 project laterally from the member 9 and are pivotally connected to the plate 8 through the ears 19 and pivot members 20. It is therefore evident that, when the U-shaped member 6 moves upward or downward, the plates 7 and 8 partake of the same motion, the plate 7 maintaining a substantially horizontal position at all times. The upper plate 8 may be turned with relation to the lower plate 7 by virtue of the pivot members 20, and this is accomplished by connection of the plate to the cover 3 through the link 21, pivotally connected at its ends to the plate and cover, respectively. A plate 22 projects downwardly along the front edge of the cover to overlap the crack between the cover and the pot, if the food inserted between the plates should be too thick to permit the cover to entirely close.

A rack 23 is secured on the back surface of the member 10 and cooperates with a sector gear 24 secured to the inside of the cover 3. A portion 25 of the sector gear 24 is not provided with teeth, the purpose being to prevent the member 6 from moving downwardly when this should not occur and to insure that the teeth of the rack 23 and the sector 24 will always mesh at the same point, that is, that the same teeth will always be in engagement. This will insure that, when the plate 7 reaches its lowermost position and the downward projection or finger 17 reaches the bottom of the pot, the edge of the cover 3 will be substantially in engagement with the upper surfaces of the casing 1 and pot 2. Screws 26 secure the sector 24 to the block 27 on the inside of the cover. Preferably the bottom 28 slopes forwardly, slightly, toward a sump 29 to which is connected the faucet 30 for drawing off the cooking fluid when it is desired to remove the same.

A bracket 31 is shown as being bolted to the back wall of the casing 1 and as having its upper end extended upwardly to form a holder for the pivot member 4 by means of which the sector 24 and cover 3 are pivotally mounted with relation to the casing. A brace 32 extends across the angle formed between the two arms of the bracket 31 and is secured thereto to give rigidity to this bracket and to insure that it will retain its form. It will be seen from Fig. 4 that there are two of these brackets for each hinge. U-shaped rods 33 extend through openings in the sectors 24 and have pivotal connection therewith. The ends of the arms of these rods extend through openings in the ends of the brackets 31 and are slidable therein. Springs 34 surround the arms of the rods 33 and, at one end, bear against the brackets 31 and, at their other ends, against the washers 35 surrounding the arms 33. These washers 35 bear against the pins 36 which pass through the arms and therefore furnish abutments against which the springs may exert pressure.

From the foregoing description, taken in connection with the annexed drawings, it will be apparent that I have provided definite, specific improvements on the structure claimed in the Fink patent referred to above. While I have disclosed herein a certain specific embodiment of my invention, I do not desire that my claims be construed as limited to the specific construction disclosed but wish this disclosure to be regarded as illustrative of the principle of my invention.

Having now described my invention, I claim:

1. A cooker of the type described comprising a cooking pot provided with a heating element, a cover for said pot, actuating means connected with said cover, a pair of pressure plates movable up and down in said pot, one of said plates being capable of pivotal movement about a pivot adjacent one edge thereof, guiding means to which said plates are connected, and connecting means having operative connection with the guiding means and the actuating means to transmit motion from the cover to the plates.

2. In a cooker of the character described, a casing, a cooking pot supported therein, pressure plates in the pot to support food-stuffs from below and to exert pressure thereon from above, said plates being movable upwardly out of the bottom part of the pot, guiding means in the casing and connected thereto, supporting means operatively connected to and supporting said plates, said supporting means cooperating with said guiding means to guide the supporting means and thereby the plates, a cover pivotally connected to said casing, and a link connecting said cover and the upper plate whereby to cause actuation of said plate upon pivotal motion of said cover.

3. A structure as defined by claim 2 in which the link connection is between the cover and that part of the upper pressure plate remote from the pivot of the cover for causing upward swinging motion of the upper plate.

4. A structure as defined by claim 2 in which the cover has a rack and gear connection with the supporting means for the plates to cause raising thereof.

5. In a cooker, comprising a casing having a cover to close the top thereof, an electrically heated container for a fluid cooking medium supported in said casing, pressure-plates in said container, a support for said plates movable up and down to submerge the plates in the cooking medium and withdraw them therefrom, a rack on said support for use in raising and lowering it, a gear on the cover to cooperate with the rack in raising and lowering the support; the combination of means connected with said casing to assist in holding the cover open or closed.

6. A structure as defined by claim 5 having a linkage connection between the cover and the upper plate to cause pivotal motion of said upper plate with relation to the lower one.

7. In a cooker, a cooking pot, a casing to enclose and support said pot, guiding means within the casing and between adjacent sides of the casing and pot, holding plates within the pot for holding food-stuff to be cooked, supporting means for said plates, means for guiding said supporting means in up and down movement, a cover for said casing, and actuating means movable with the cover to move the plate-supporting means up and down.

8. In a cooker, in combination, a cooking pot, a supporting and enclosing casing therefor, upper and lower pressure plates within the pot movable up and down out of and into cooking position, guiding means for directing the lower plate in its up and down movement, supporting means for said lower plate, a cover for said pot, and actuating means connecting said cover and said supporting means to transmit motion from said cover to said lower plate.

9. A structure as defined by claim 8 provided with a dead-center holding means connected to the cover to act thereon in holding the cover up or down.

10. A structure as defined by claim 8 having a linkage connection between the cover and upper plate for causing pivotal motion of the upper plate with respect to the lower plate.

11. In a cooker, in combination, a cooking pot, a supporting and enclosing casing therefor, upper and lower pressure plates within the pot movable up and down out of and into cooking position, guiding means for directing the lower plate in its up and down movement, supporting means for said lower plate, a cover for said pot, actuating means connecting said cover and said supporting means to transmit motion from said cover to said lower plate, a dead-center holding means connected to the cover to act thereon in holding the cover up or down, and a linkage connection between the cover and the upper plate for causing pivotal motion of the upper plate with respect to the lower plate as the plates are raised and lowered.

12. In a cooker, in combination, a cooking pot, a supporting and enclosing casing therefor, upper and lower pressure plates within the pot movable up and down out of and into cooking position, guiding means for directing the lower plate in its up and down movement, supporting means for said lower plate, a cover for said pot, and actuating means connecting said cover and said supporting means to transmit motion from said cover to said lower plate, said actuating means comprising a rack on said supporting means and a sector gear on said cover, said sector gear meshing said rack to cause motion thereof and of said plates, and the sector gear having a portion of its periphery untoothed whereby to permit additional movement of the cover after the plates have been raised as far as desired.

13. In a cooker, in combination, a cooking pot and supporting and enclosing casing therefor, a cover pivoted thereon, a sector connected to said cover and centered coaxially therewith, a pair of pressure plates movable up and down in said pot, the upper plate being pivotally connected to the lower plate and the cover, a rack connected to said plates to move them up and down, and a link connecting the cover and upper plate, said rack cooperating with said sector to move the plates up and down as the cover is raised or lowered, the movement of the cover causing, through said link, corresponding motion of the upper plate as the cover is turned on its pivot.

14. A structure as defined by claim 13 having pressure means connecting the cover and casing to urge the cover toward open or closed position, depending upon whether the cover is opened or closed.

HERCHAEL WOOD MILLER.